United States Patent [19]
Boling et al.

[11] Patent Number: 6,044,257
[45] Date of Patent: Mar. 28, 2000

[54] PANIC BUTTON PHONE

[75] Inventors: Brian M. Boling; Michael C. Bernstein; Nicolas A. Natale, all of Knoxville, Tenn.

[73] Assignee: American Secure Care, LLC, Knoxville, Tenn.

[21] Appl. No.: 09/044,497

[22] Filed: Mar. 19, 1998

[51] Int. Cl.[7] .................................................. H04Q 7/20
[52] U.S. Cl. ..................... 455/404; 445/414; 445/415; 445/422; 445/456
[58] Field of Search ..................... 455/404, 414, 455/422, 100, 91, 415, 456; 340/426, 825.36, 825.49, 539, 425.5; 379/37, 38; 342/357, 457

[56] References Cited

U.S. PATENT DOCUMENTS

| | | | |
|---|---|---|---|
| 4,446,454 | 5/1984 | Pyle | 340/538 |
| 5,203,009 | 4/1993 | Bogusz et al. | 455/33.1 |
| 5,305,370 | 4/1994 | Kearns et al. | 379/45 |
| 5,334,974 | 8/1994 | Simms et al. | 340/990 |
| 5,365,570 | 11/1994 | Boubelik | 379/59 |
| 5,377,256 | 12/1994 | Franklin et al. | 379/59 |
| 5,465,388 | 11/1995 | Zicker | 455/404 |
| 5,479,482 | 12/1995 | Grimes | 379/59 |
| 5,594,425 | 1/1997 | Ladner et al. | 340/825.06 |
| 5,687,215 | 11/1997 | Timm et al. | 379/59 |
| 5,694,452 | 12/1997 | Bertolet | 379/51 |
| 5,712,619 | 1/1998 | Simkin | 340/539 |
| 5,742,686 | 4/1998 | Finley | 380/28 |
| 5,748,089 | 5/1998 | Sizemore | 340/574 |
| 5,797,091 | 8/1998 | Clise et al. | 455/404 |
| 5,815,118 | 9/1998 | Schipper | 342/451 |

*Primary Examiner*—Wellington Chin
*Assistant Examiner*—Yemane Woldetatios
*Attorney, Agent, or Firm*—Luedeka, Neely & Graham, P.C.

[57] ABSTRACT

An emergency use only panic button phone provides a low cost comprehensive personal security device. The panic button phone has a large button located on a rigid housing that contains a cellular receiver and transmitter. Pressing the large button allows the user of the panic button phone to establish full duplex cellular voice communications with an emergency response center and summon emergency response personnel. Preferably, a flip top cover that is connected by hinges to the rigid housing folds over the large button and minimizes the likelihood the large button will be accidentally pressed. A global positioning device in the panic button phone provides the location of the operator to the emergency response center. A small button on the rigid housing activates a noise alarm that alerts individuals in the immediate area that an emergency situation exists. In addition, a second small button activates a radio transmitter that signals the home alarm system of the operator if the operator is near the home when the button is pressed. In response to being signaled, the home alarm system initiates appropriate security measures such as turning on the house's lights and producing an audible alarm.

18 Claims, 2 Drawing Sheets

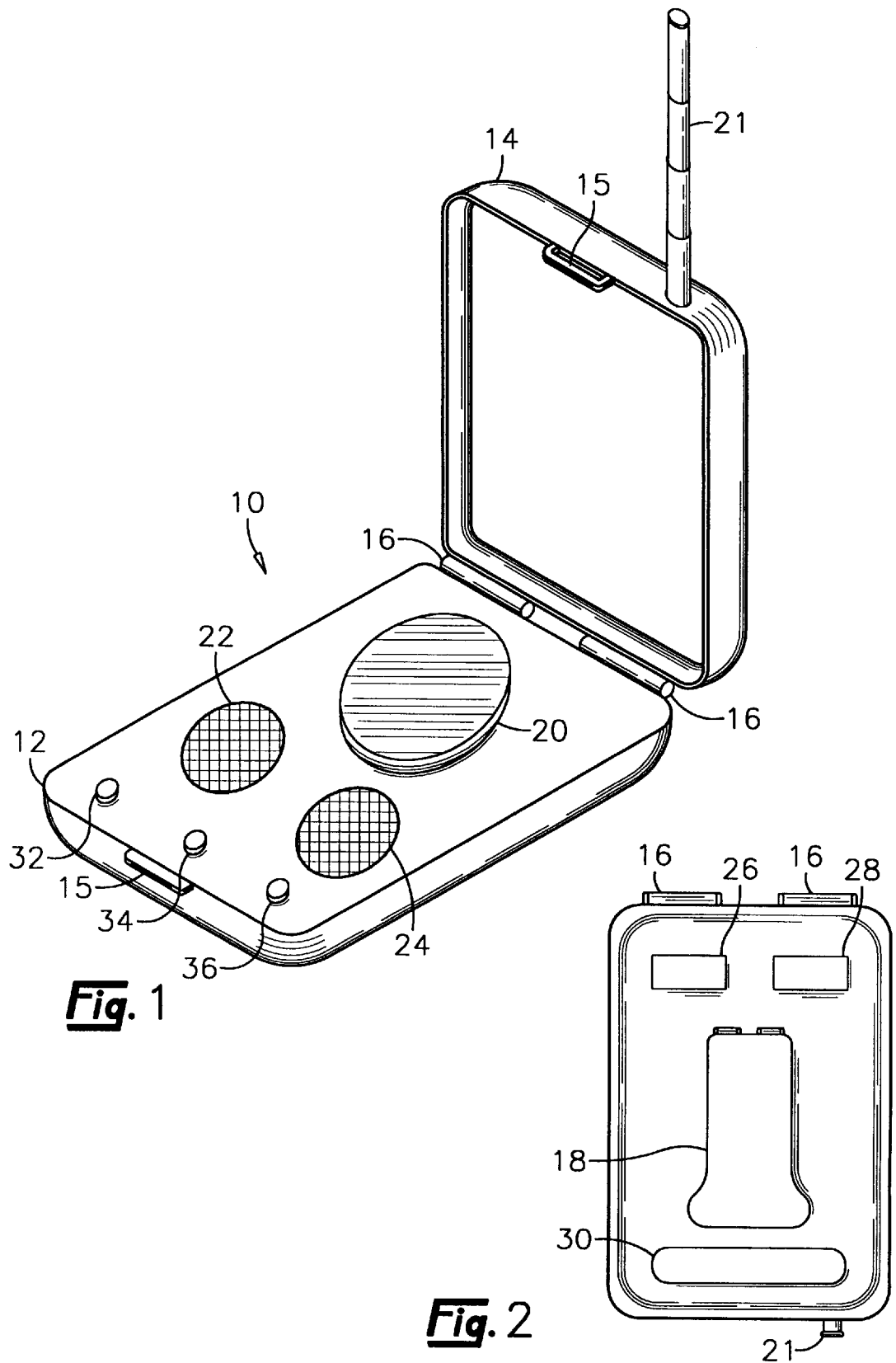

PANIC BUTTON PHONE

BACKGROUND

FIELD OF THE INVENTION

In general, the present invention relates to a panic button phone that has a single button for establishing cellular telephone contact with an emergency response center. In particular, the present invention relates to a portable cellular device that produces a noise alarm, establishes radio communication with a home alarm base station, establishes full duplex voice communication with the emergency response center, and provides the emergency response center with the location of the portable cellular device.

BACKGROUND OF THE INVENTION

Emergency response numbers such as 911 are utilized to provide individuals with a quick and easy way to contact an emergency response center when an emergency situation arises. By providing a standardized method of contacting emergency personnel, these emergency response numbers are effective in reducing the amount of time necessary to respond to an emergency. In an emergency, the amount of time required to respond can often mean the difference between life and death. Response time may be further minimized by employing caller identification technology that allows the operator of the emergency response center to automatically determine the phone number of the caller without requiring the caller to provide such information. If the call was placed from a stationary telephone, the operator at the emergency response center can also determine the location of the caller. Thus, even if the user is unable to verbally request assistance, the emergency response center can still send emergency response personnel to the location from which the call was placed.

One of the primary shortcomings of the prior art devices for utilizing the 911 emergency response system is that a phone terminal is needed to contact an emergency response center. If the emergency situation occurs in a remote area, it is often impossible to place a call to the emergency response system. However, with the advent of cellular telephone technology it is now possible to carry a cellular telephone that allows an emergency caller to contact an emergency response center from practically anywhere. The primary drawbacks of the cellular system are the high cost of cellular service and the inability of the emergency response center to automatically determine the location of the caller.

Cellular devices and services have been offered that are limited to emergency use only. These devices have several buttons that allow a variety of emergency services such as fire, medical and police to be summoned. By restricting use of the cellular phone to emergency situations, the user can either avoid or defer some of the costs associated with a full service cellular phone. However, these devices have multiple buttons and functions which may cause confusion in an emergency situation. Because of the stress often associated with emergency situations, an operator of such a complex emergency communication device may fail to properly summon emergency personnel. In addition, these emergency communication devices fail to integrate the functioning of the cellular device with home alarm systems that the user of the device might have. Furthermore, the devices do not have the capability to summon individuals in the immediate area around the device that may be able to provide assistance.

SUMMARY OF THE INVENTION

The present invention eliminates the oversights, difficulties, and disadvantages of the prior art by providing a simplified emergency communication apparatus for contacting an emergency response center that consists of a rigid housing containing a portable cellular device and a single large switch mounted on the rigid housing that causes the portable cellular device to establish full duplex communication with an emergency response center when pressed.

By limiting use of the portable cellular device to emergency situations, a user should be able to subscribe to a cellular service for a greatly reduced fee. In fact, present FTC regulations prohibit charging for, or refusing to connect, a call made to a 911 emergency response center. Thus, the panic button phone 10 could presently be used without incurring any subscriber fees at all. More importantly, placing only a single large switch on the cellular device makes contacting an emergency response center exceedingly simple. Thus, even in an extremely stressful emergency situation, the portable cellular device is almost impossible to operate incorrectly. Furthermore, the simplicity of the device makes it especially adaptable for use by young children and physically and mentally impaired individuals.

Another embodiment of the emergency communication apparatus provides a portable cellular device for contacting an emergency response center. The device is contained in a rigid housing and has a single large button mounted on the rigid housing that causes the portable cellular device to establish full duplex communication with an emergency response center when pressed. A radio transmitter is included that contacts the home security system of the user of the portable cellular device if the portable cellular device is near the home security system. In one embodiment, the home security system is only signaled when a small button on the panic button phone is pressed. In another embodiment, the home security system is automatically signaled when the single large button is pressed. The radio transmitter also attempts to contact the car alarm in the operator's car if the car is within radio communications range when the cellular device is activated. A retractable antenna transmits and receives signals to and from the emergency response center by way of a cellular network. The portable cellular device is powered by a power supply located in the rigid housing.

Once the single large button has been pressed, the cellular device establishes contact with an emergency response center by dialing the number of the emergency response center with an automatic dialer. A microprocessor control circuit controls the functioning of the electronic components of the portable cellular device. Any information needed to contact the emergency response center, such as a phone number, is contained in a memory device. The microprocessor control circuit attempts to establish contact with the emergency response center using a cellular transceiver to send and receive electronic signals to and from the retractable antenna. Once contact is established, a microphone receives any verbal inputs from the user of the portable cellular device and converts the verbal inputs into electronic signals that are transmitted to the emergency response center through a cellular telephone network. A speaker converts the electrical signals received from the cellular transceiver into audible sounds.

A flip top cover is mounted on the rigid housing to cover the single large button and reduce the possibility of accidentally activating the portable cellular device. A first and a second small button are located on the outside of the flip top cover. The first small button activates a noise maker and a flashing light source and the second small button signals the user's home security system. A set of indicator lights provide information to the user of the device by indicating that the portable cellular device is in cellular communications range with a cellular network, that the portable cellular device has been activated and that the portable cellular device's power supply is running low. A clip is provided on the outside of the flip top cover that allows the portable cellular device to be removably attached to an object such as a belt or purse strap.

The embodiment discussed above provides a number of distinct advantages over the prior art. For example, the provision of a noise maker and a flashing light source in conjunction with the cellular device provide an extra degree of security by alerting any individuals in the immediate area that an emergency situation exists. Furthermore, the radio frequency transmitter that contacts the home security system when the single large button is pressed allows the home security system to implement additional measures to insure the safety of the operator of the cellular device. These measures may include actions such as turning on and off the lights of the residence in a timed sequence, sounding an audible alarm, locking or unlocking the doors of the residence and activating any other emergency measures incorporated in the home security system. As previously stated, the flip top cover helps reduce the the likelihood that the single large button will be accidentally pressed. This is very beneficial because false alarms tend to decrease the effectiveness of any alarm system by increasing skepticism among individuals receiving the alarm that an emergency situation actually exists.

BRIEF DESCRIPTION OF THE DRAWINGS

Other objects, features and advantages of the present invention will become apparent by reference to the following detailed description when considered in conjunction with the accompanying drawings, in which like reference characters refer to like parts throughout the views, and wherein:

FIG. 1 is a isometric view of a panic button phone with a flip top cover in the open position;

FIG. 2 is a top view of the panic button phone of FIG. 1 with the flip top cover in the closed position.

DESCRIPTION OF THE PREFERRED EMBODIMENT(S)

Figure 3:
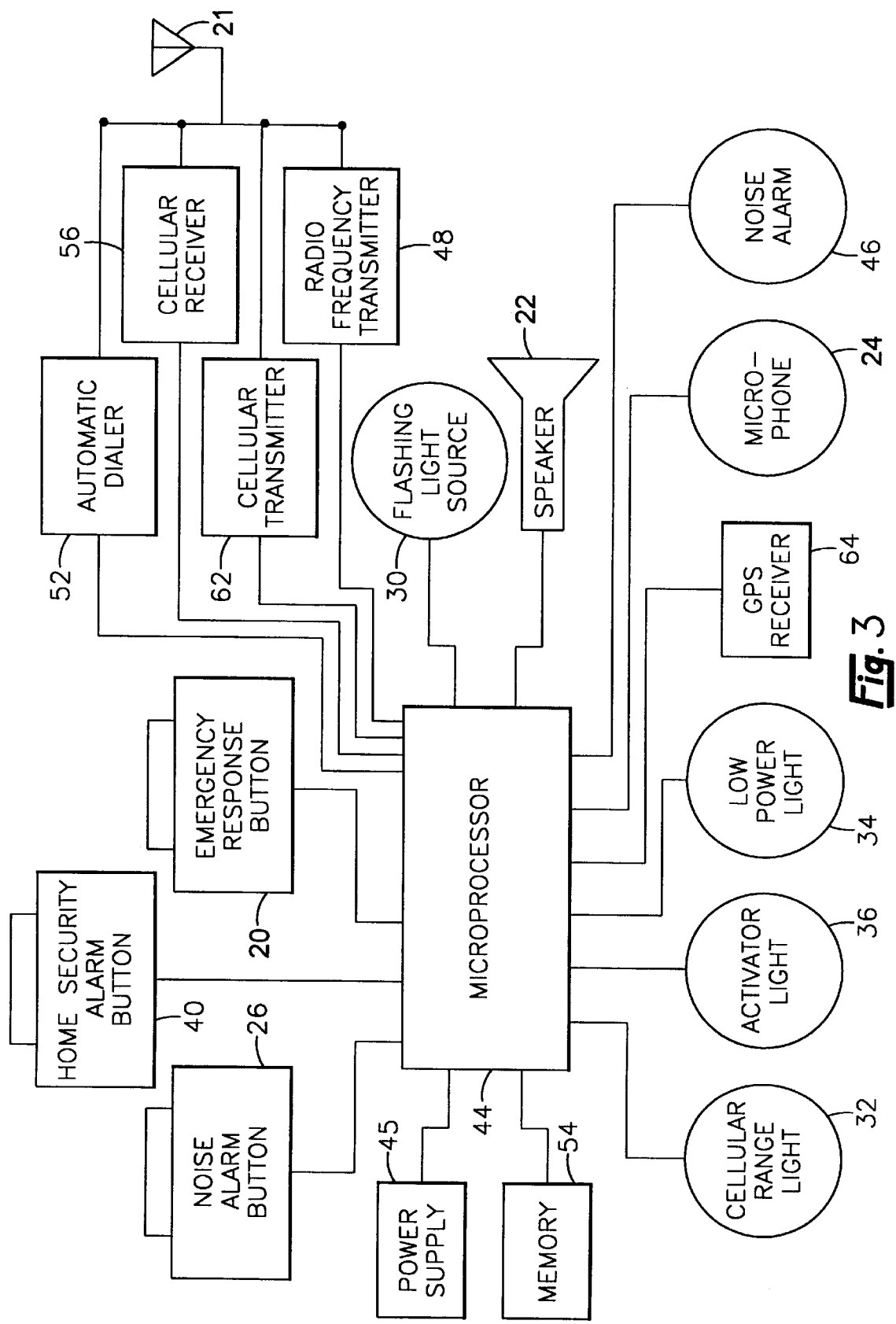
FIG. 3 is a functional block diagram of a panic button phone in accordance with the invention.

Referring to FIGS. 1 and 2, an embodiment of the present invention for summoning help in an emergency is shown. The internal components of the emergency communication apparatus 10 or panic button phone 10 are contained within a rigid housing 12. The rigid housing 12 is constructed out of a durable material that will withstand being continuously carried in an individuals pocket or purse. Preferably, a flip top cover 14 is connected to the rigid housing 12 with a pair of hinges 16. The flip top cover 14 folds over the rigid housing 12. The flip top cover 14 is spring loaded in the closed position where it is held in place by a latch 15. When the latch 15 is pressed, the flip top cover 14 is released and springs open to reveal the top of the rigid housing 12. A clip 18 is provided on the outside of the flip top cover 14 that allows the panic button phone 10 to be carried on the waistband or belt of a user.

The flip top cover 14 covers a single large switch or button 20 when it is in the closed position. The flip top cover 14 helps prevent the large button 20 from being accidentally pressed. The single large button 20 activates the panic button phone 10 when it is pressed. To summon help in an emergency situation, a user simply presses the latch 15 to open the flip top cover 14. As soon as the flip top cover 14 is opened, the panic button phone 10 begins searching for a cellular provider. Once a communication channel is assigned to the panic button phone 10 by a cellular telephone provider, pressing the single large button 20 will cause the panic button phone 10 to automatically contact an emergency response center such as the familiar 911 service. A radio frequency antenna 21 mounted on the flip top cover 14 is used to transmit and receive the cellular communications. The antenna 21 is preferably retractable so that the panic button phone 10 is compact and can be easily stored in a pocket or purse without worrying about damaging the antenna 21. A speaker 22 and a microphone 24 located on the rigid housing 12 of the panic button phone 10 enable the operator of the panic button phone 10 to establish full duplex voice communications with the personnel at the emergency response center. In an alternate embodiment, the microphone 24 is located on the outside of the flip top cover 14 and the speaker 22 is replaced with a tethered ear piece that is placed in the ear of the operator. The operator of the panic button phone 10 can disconnect the call to the emergency center simply by closing the flip top cover 14.

In order to minimize the cost of the cellular service needed to support it, the panic button phone 10 is strictly limited to emergency use only. Because a cellular service provider can be sure that the panic button phone 10 will only be used in emergency situations, the service provider will typically be willing to provide the cellular service at a reduced rate. Furthermore, as previously discussed, governmental regulations prohibit cellular service providers from refusing calls to 911 emergency response centers even if the caller does not subscribe to a cellular service. Another one of the primary benefits of limiting use of the panic button phone 10 to contacting an emergency response center with a single large button 20 is the resulting simplicity of operation. The single large button 20 is preferably one quarter to one and one half inches in diameter. Even very young children and elderly consumers can be taught how to summon emergency personnel with the panic button phone 10. Additionally, the time required to summon the emergency personnel is held to an absolute minimum. Almost as soon as the panic button 20 is pressed, the emergency response center personnel have a verbal communications link to the scene of the emergency. Furthermore, as discussed in more detail below, the panic button phone 10 may include a locator function which uses global positioning systems (GPS) and cellular location systems to provide the location of the panic button phone 10 to the emergency response center.

In addition to establishing cellular contact with an emergency response center, the panic button phone 10 may be configured to activate the home security system of the user. Because the radio communications range of the panic button phone 10 is limited, the panic button phone 10 can only contact the user's home security system when the panic button phone 10 is close to the home security system. Preferably, the radio communications range of panic button phone 10 extends to at least 500 feet from the home security system. The home security system can react to the panic button phone's signal in a number of ways. In the preferred embodiment, the home security system turns the lights of the residence on and off and activates any audible alarms that the home security system uses. Turning on and off the house's lights and sounding the home security system's audible alarms can be beneficial for a number of reasons. First, the home security system alarm will only be activated if the panic button phone 10 is pressed when it is near the home. Thus, if the emergency situation involves an intruder or attacker, turning on the lights and sounding the alarms may scare the individual away. Secondly, turning on the lights and sounding the alarms will alert any individuals in or around the house that an emergency situation exists in or near the house. In addition, any of the variety of other functions typically performed by a home security system can be triggered by the signal from the panic button phone 10.

An embodiment of the panic button phone 10 is also provided that contacts the car alarm of the user. In a manner similar to that described for contacting the home security system of the user, the panic button phone 10 transmits a signal that activates the car alarm. The panic button phone 10 will only be able to signal the car alarm if the user is near the car when the panic button phone 10 is activated. Thus, the car alarm will help draw attention to the area in which the emergency situation exists. This could be especially beneficial if the emergency situation arose in a parking lot. Furthermore, if the car was just stolen, setting off the car alarm will draw attention to the thief and the stolen car.

In the embodiment depicted in FIGS. 1 and 2, the speaker 22 is also used as an audible alarm or noise maker that alerts individuals in the immediate area that an emergency exists. The noise maker is activated by pressing a button 26 on the flip top cover 14 of the panic button phone 10. Once button 26 is pressed the speaker 22 will begin emitting an alarm type noise. The number of different sounds that could be produced is limitless but the noise produced is preferably similar to that produced by a car alarm. In the preferred embodiment, the noise alarm stops producing noise when the flip top cover 14 is opened. Stopping the noise alarm when the flip top cover 14 is opened prevents the noise alarm from overwhelming the operator's voice when the emergency response center is contacted. In an alternate embodiment, the noise alarm is deactivated by pressing the noise alarm button 26 again.

Also located on the flip top cover 14 is a visual alarm button 28 that activates a flashing light source 30 on the flip top cover 14. Both the flashing light source 30 and the noise alarm serve the same functions. On the one hand they serve to scare off attackers, on the other hand they serve to draw attention to the individual requesting emergency assistance. Because the panic button phone 10 can be activated from anywhere that cellular service is available, the exact location of the caller may be unknown to the emergency response personnel. Thus, by drawing attention to the panic button phone 10 and its operator, the flashing light source 30 and the noise maker may be very helpful to emergency response personnel attempting to locate the individual who summoned them.

A set of indicator lights 32, 34 and 36 are preferably located on the front of the rigid housing 12 that provide an operator of the panic button phone 10 information concerning whether or not the panic button phone 10 is within communications range of a cellular station, whether or not the panic button phone 10 has been activated and whether or not the power supply of the panic button phone 10 is running low. In an especially preferred embodiment, the cellular range indicator light 32 is green when a channel is assigned to the panic button phone 10 by a wireless telephone carrier and red when no service is possible, the activation light 36 is off when the panic button phone 10 has not been activated and turns red when the phone 10 is activated and the power supply light 34 is off when the power supply is functioning properly and turns yellow to indicate a low power supply.

As described above, a preferred embodiment of the present invention includes a locator function. The locator function provides the location of the panic button phone 10 at the time it was activated to the emergency response center. The locator function is implemented in a variety of manners in different embodiments of the present invention. One embodiment involves the use of a GPS receiver. A GPS receiver utilizes signals from satellites orbiting the earth to determine the position of the receiver. When the single large button 20 is pressed, the GPS receiver determines the location of the panic button phone 10. The panic button phone 10 then automatically transmits this positional information to the emergency response center. Another embodiment of the present invention uses a cellular location system to determine the position of the panic button phone 10 by triangulation. This cellular location system uses the strength of the signal from a cellular device at different cellular stations to determine the location of the cellular device. Positional information is extremely beneficial in an emergency situation because it allows the emergency response center to determine the location of the caller without requiring any input from the caller.

Referring now to FIG. 3, a block diagram of the electrical components of a preferred embodiment of the panic button phone 10 is shown. The electrical components of the panic button phone 10 are controlled by a microprocessor 44. Power for the electrical components of the panic button phone 10 is supplied by a power supply 45. In an especially preferred embodiment, the power supply 45 is a DC power supply and includes replaceable batteries such as AA or AAA alkaline batteries. These types of batteries are preferred because they will allow a minimum talk time of at least 30 minutes, are relatively inexpensive, and are easily replaceable.

The embodiment shown has three user input buttons 26, 40 and 20. While the user inputs 26, 40 and 20 are shown and discussed as buttons, it is understood that the inputs 26, 40 and 20 may be a switch, touch sensor, or other similar device that functions like a button.

A noise alarm button 26 is provided that activates a noise alarm 46. When the noise alarm button 26 is pressed, a noise alarm signal is sent to the microprocessor 44. The microprocessor 44 receives the noise alarm signal and produces a noise alarm activation signal that is sent to the noise alarm 46. In this embodiment, the noise alarm 46 preferably consists of a siren-type speaker that creates a high decibel noise. The noise alarm 46 can be deactivated by simply pressing the noise alarm button 26 a second time or by opening the flip top cover 14.

In an alternate embodiment, a flashing light source 30 is also provided. The flashing light source 30 is activated in response to the noise alarm button 26 or emergency response button 20 being pressed. The flashing light source 30 helps to alert individuals in the immediate area that an emergency situation exists. In addition, once emergency response personnel have been summoned, the flashing light source 30 can help the emergency personnel locate the panic button phone 10 and, thus, the individual who summoned the assistance.

A home security alarm button 40 is also provided. When the home alarm button 40 is pressed, a home alarm signal is sent to the microprocessor 44. In response to the home alarm signal, the microprocessor 44 produces an activation signal which is sent to a radio frequency transmitter 48. The radio frequency transmitter 48 conditions the activation signal and broadcasts it on an antenna 21. The preferred radio frequency transmitter 48 operates at 310 MHZ. The home security system detects the broadcast activation signal and responds accordingly. As discussed in greater detail above, the response preferably at least includes turning on and off the exterior lights of the house and producing an audible alarm.

The emergency alarm button 20 sends a signal to the microprocessor 44 when it is pressed that prompts the microprocessor 44 to activate an automatic dialer 52. The automatic dialer 52 dials the telephone number of the emergency response center. The telephone number is preferably stored in the automatic dialer 52 itself. However, in an alternate embodiment a memory 54 is provided for storing the telephone number. A cellular receiver 56 receives the message signals from the emergency response center and conditions the signals. The cellular receiver 56 may provide these conditioned signals to the speaker 22 directly or through the microprocessor 44 as shown in FIG. 2. The operator of the panic button phone 10 can respond to the messages from the emergency response center by speaking into the microphone 24. The microphone 24 converts the operator's speech into electric signals that are received by the microprocessor 44. The microprocessor 44 then sends the signals to a cellular transmitter 62 which conditions the signals and broadcast them on the antenna 21. In an alternate embodiment, the signals are sent directly from the microphone 24 to the cellular transmitter 62.

The panic button phone 10 is designed to use the cellular communications technology that provides the most comprehensive coverage possible. Using the cellular technology that provides the largest possible coverage area is desirable because it minimizes the likelihood the operator of the panic button phone 10 will be out of cellular communications range when an emergency situations arises. While the coverage range of digital cellular service providers is constantly increasing, the largest amount of cellular coverage is still provided by service providers using analog modulation technology. Thus, in the preferred embodiment, the cellular receiver 56 and cellular transmitter 62 use analog modulation technology. Furthermore, because the amount of time actually spent communicating with the panic button phone 10 will likely be very low, the cellular receiver 56 and transmitter 62 components are designed for maximum range and minimal talk times.

In another alternative embodiment, the panic button phone 10 is designed to scan for a digital cellular provider. If a digital cellular service provider is located, the panic button phone 10 will establish digital communications with the digital service provider. If no digital service provider is located, the panic button phone 10 then attempts to establish analog cellular communications with an analog service provider.

In the embodiment of FIG. 3, the microprocessor 44 prompts a GPS receiver 64 to determine the location of the panic button phone 10 when the emergency response button 20 is pressed. Once the GPS receiver 64 has determined the coordinates of the panic button phone 10, the GPS receiver 64 provides the coordinates to the microprocessor 44. The microprocessor 44 then sends the coordinates to the cellular transmitter 62. The cellular transmitter 62 sends the location coordinates to the emergency response center by way of a cellular telephone network. The location coordinates allow the emergency response center to dispatch emergency personnel to the location from which the call was placed without even questioning the caller.

The microprocessor 44 also controls a set of indicator lights 32, 34 and 36. The set of indicator lights 32, 34 and 36 provide the operator of the panic button phone 10 status information concerning the functioning of the phone 10. As previously discussed, the indicator lights 32, 34 and 36 preferably include a cellular range indicator light 32, a low power light 34, and an activation light 36. However, it is understood that a variety of different indicator lights 32, 34 and 36 could be provided without departing from the spirit of the invention.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. A portable emergency communication apparatus for contacting a public emergency response center, and establishing full duplex voice communication between an operator of the apparatus and emergency personnel at the public emergency response center, the emergency communication apparatus comprising:

a rigid housing for containing the emergency communication apparatus;

a single button mounted on the rigid housing that, when pressed, causes activation of the emergency communication apparatus to establish full duplex cellular voice communication with the public emergency response center;

a cellular transmitter contained within the rigid housing for transmitting cellular phone signals the transmitter operable to establish communication with only the public emergency response center when the single button is pressed, thereby reducing or eliminating costs associated with nonemergency cellular phone service;

a cellular receiver for receiving voice message signals from the emergency response center and for conditioning the voice message signals to produce conditioned signals;

a speaker for receiving the conditioned signals and producing audible sound based on the voice message signals from the public emergency response center;

a microphone for producing electrical signals based on audible speech of the operator whereby the operator may respond to the voice message signals from the public emergency response center;

the cellular transmitter further for receiving the electrical signals and generating cellular phone signals based on the electrical signals for broadcast to the public emergency response center substantially simultaneously with the production of the electrical signals by the microphone;

the cellular transmitter being operable to transmit cellular phone signals as the receiver simultaneously receives voice message signals from the emergency response center, and the receiver being operable to receive voice message signals as the transmitter simultaneously transmits cellular phone signals, whereby the operator of the emergency communication apparatus and personnel at the public emergency response center may engage in verbal communications, and an audible alarm disposed within the housing for producing noise to alert individuals in the area surrounding the emergency communication apparatus that an emergency situation exists.

2. The emergency communication apparatus of claim 1 further comprising a radio frequency transmitter for establishing radio communications with a home security system of a user of the emergency communication apparatus if the emergency communication apparatus is within radio communication range of the home security system when an emergency situation arises.

3. The emergency communication apparatus of claim 1 further comprising a radio frequency transmitter for activating a car alarm system of a user of the emergency communication apparatus, and for causing the car alarm system to sound an audible alarm if the emergency communication apparatus is within radio communications range of the car alarm system when an emergency situation arises.

4. The emergency communication apparatus of claim 1 further comprising a flip top cover mounted on the rigid housing that covers the single button and reduces the possibility of accidentally activating the emergency communication apparatus.

5. The emergency communication apparatus of claim 1 wherein the emergency communication apparatus uses only analog modulation communications.

6. The emergency communication apparatus of claim 1 wherein the emergency communication apparatus is designed to use digital modulation if a digital cellular service provider is within digital cellular communications range and analog modulation if a digital cellular service provider is not within communications range.

7. The emergency communication apparatus of claim 1 further comprising a set of indicator lights for indicating that the emergency communication apparatus is in cellular communications range with a cellular network, that the emergency communication apparatus has been activated or that the emergency communication apparatus needs new batteries.

8. A portable emergency communication apparatus for contacting a public emergency response center and establishing full duplex voice communication between an operator of the apparatus and emergency personnel at the public emergency response center, comprising:
   a rigid protective housing;
   a single button mounted on the housing that, when pressed, causes activation of the emergency communication apparatus to establish full duplex cellular voice communication with the public emergency response center;
   a cellular transmitter contained within the rigid housing for transmitting cellular phone signals, the transmitter operable to establish communication with only the public emergency response center when the single button is pressed, thereby reducing or eliminating costs associated with nonemergency cellular phone service;
   a cellular receiver for receiving voice message signals from the emergency response center and for conditioning the voice message signals to produce conditioned signals;
   a speaker for receiving the conditioned signals and producing audible sound based on the voice message signals from the public emergency response center;
   a microphone for producing electrical signals based on audible speech of the operator whereby the operator may respond to the voice message signals from the public emergency response center;
   the cellular transmitter further for receiving the electrical signals and generating cellular phone signals based on the electrical signals for broadcast to the public emergency response center substantially simultaneously with the production of the electrical signals by the microphone;
   the cellular transmitter being operable to transmit cellular phone signals as the receiver simultaneously receives voice message signals from the public emergency response center, and the receiver being operable to receive voice message signals as the transmitter simultaneously transmits cellular phone signals, whereby the operator of the emergency communication apparatus and personnel at the public emergency response center may engage in verbal communications; and
   locator means disposed within the housing for providing the location of the emergency communication apparatus to the emergency response center when the single button is pressed and the emergency response center is contacted.

9. The emergency communications apparatus of claim 8 wherein the locator means use the global positioning satellite system to determine the location of the emergency communications apparatus when the single button is pressed.

10. The emergency communication apparatus of claim 1 further comprising a flashing light source for alerting individuals in the area surrounding the emergency communication apparatus that an emergency situation exists.

11. A security system for summoning assistance in an emergency situation, the security system comprising;
   a home security system for producing alarms in response to a variety of emergency situations; and
   a portable personal security device comprising:
      a rigid protective housing;
      a radio frequency transmitter disposed within the housing for activating the home security system if the portable personal security device is within communications range of the home security system when the radio frequency transceiver is activated;
      a home security alarm button mounted on the housing that activates the radio frequency transmitter and causes the portable personal security device to activate the home security system;
      an emergency response button mounted on the housing that, when pressed, activates the portable device to establish full duplex cellular voice communications with a public emergency response center;
      a cellular transmitter disposed within the housing for transmitting cellular phone signals, the transmitter operable to establish communication with only the public emergency response center when the single button is pressed, thereby reducing or eliminating costs associated with nonemergency cellular phone service;
      a cellular receiver for receiving voice message signals from the emergency response center and for conditioning the voice message signals to produce conditioned signals;
      a speaker for receiving the conditioned signals and producing audible sound based on the voice message signals from the public emergency response center;
      a microphone for producing electrical signals based on audible speech of the operator whereby the operator may respond to the voice message signals from the public emergency response center;
      the cellular transmitter further for receiving the electrical signals and generating cellular phone signals based on the electrical signals for broadcast to the public emergency response center substantially simultaneously with the production of the electrical signals by the microphone;

the cellular transmitter being operable to transmit cellular phone signals as the receiver simultaneously receives voice message signals from the public emergency response center, and the receiver being operable to receive voice message signals as the transmitter simultaneously transmits cellular phone signals, whereby the operator of the emergency communication apparatus and personnel at the public emergency response center may engage in verbal communications; and an audible alarm disposed within the housing for causing a noise to emanate from the portable personal security device for alerting individuals within audible range of the audible alarm that an emergency situation exists; and an audible alarm button mounted on the housing that activates the audible alarm and causes the noise to emanate from the portable personal security device.

12. The security system of claim 11 wherein the radio frequency transmitter is further operable to activate a car alarm system, and to cause the car alarm system to sound an audible alarm in response to the home security alarm button being pressed if the portable personal security device is within radio communications range of the car alarm system at the time the home security alarm button is pressed.

13. The security system of claim 11 wherein the cellular transceiver is designed to use analog modulation only.

14. The security system of claim 11 wherein the portable personal security device further comprises locator means disposed within the housing for providing the location of the portable personal security device to the emergency response center when the emergency response button is pressed and the emergency response center is contacted.

15. The security system of claim 11 further comprising a set of indicator lights for indicating that the cellular device is in cellular communications range with a cellular network or the home security system.

16. The security system of claim 11 wherein the rigid housing further comprises a flip top cover that covers the emergency response, home security alarm and audible alarm buttons and minimizes the likelihood that the buttons will be inadvertently activated.

17. The security system of claim 11 wherein the portable personal security device further comprises a flashing light source mounted on the housing that is activated when the audible alarm button is pressed, the flashing light source for alerting individuals in the area surrounding the emergency communication apparatus that an emergency situation exists.

18. A portable cellular device for contacting a public emergency response center, the device comprising:

a rigid housing for containing the portable cellular device;

a single large button mounted on the rigid housing that causes the portable cellular device to establish full duplex voice communication with the public emergency response center when pressed;

a flip top cover mounted on the rigid housing that covers the single large button and reduces the possibility of accidentally activating the portable cellular device;

a radio transmitter disposed within the housing for contacting a home security system of a user of the portable cellular device if the portable cellular device is near the home security system when it is activated;

an audible alarm disposed within the housing for producing noise to alert individuals in the immediate area surrounding the cellular device that an emergency situation exists;

a first and a second small button located on the flip top cover wherein the first small button activates the audible alarm and the second small button activates the user's home security system;

a retractable antenna mounted on the housing for receiving and transmitting electronic signals to and from the emergency response center;

a cellular receiver disposed within the housing for receiving electronic voice message signals from the retractable antenna and for conditioning the voice message signals to produce conditioned signals;

a cellular transmitter disposed within the housing for sending electronic cellular phone signals to the retractable antenna, the transmitter operable to establish communication with only the public emergency response center when the single large button is pressed, thereby reducing or eliminating costs associated with nonemergency cellular phone service;

a microprocessor control circuit disposed within the housing for controlling the functioning of the portable cellular device;

a memory device for providing storage space for storing information;

an automatic dialer operable to dial only a phone number of the public emergency response center;

a set of indicator lights mounted on the housing for indicating that the portable cellular device is in cellular communications range with a cellular network, that the portable cellular device has been activated or that the power supply in the portable cellular device needs replacing;

a clip mounted on the housing that allows the portable cellular device to be removably attached to an object such as a belt or purse strap;

a power supply disposed within the housing for providing power to the portable cellular device;

a speaker disposed within the housing for receiving the conditioned signals and for producing audible sound based on the voice message signals received from the public emergency response center; and a microphone disposed within the housing for receiving verbal inputs from the user of the portable cellular device and converting the verbal inputs into electrical signals;

the cellular transmitter further for receiving the electrical signals from the microphone and generating cellular phone signals based on the electrical signals for broadcast to the public emergency response center substantially simultaneously with the production of the electrical signals by the microphone; and the cellular transmitter being operable to transmit cellular phone signals as the receiver simultaneously receives voice message signals from the emergency response center, and the receiver being operable to receive voice message signals as the transmitter simultaneously transmits cellular phone signals, whereby the operator of the emergency communication apparatus and personnel at the public emergency response center may engage in verbal communications.

\* \* \* \* \*

UNITED STATES PATENT AND TRADEMARK OFFICE
CERTIFICATE OF CORRECTION

PATENT NO : 6,044,257
DATED      : March 28, 2000
INVENTOR(S): Boling et al.

It is certified that error appears in the above-identified patent and that said Letters Patent are hereby corrected as shown below:

On the title page, item:

"[75] Inventors:", the third listed inventor should be --Nicholas A. Natale-- (instead of Nicolas A. Natale).

At Column 3, line 24, before "likelihood", the third instance of "the" should be deleted.

Signed and Sealed this

Eighth Day of May, 2001

*Attest:*

NICHOLAS P. GODICI

*Attesting Officer*   Acting Director of the United States Patent and Trademark Office